April 17, 1934.  E. F. HUDDLE  1,955,544
MOWER
Filed Nov. 17, 1933
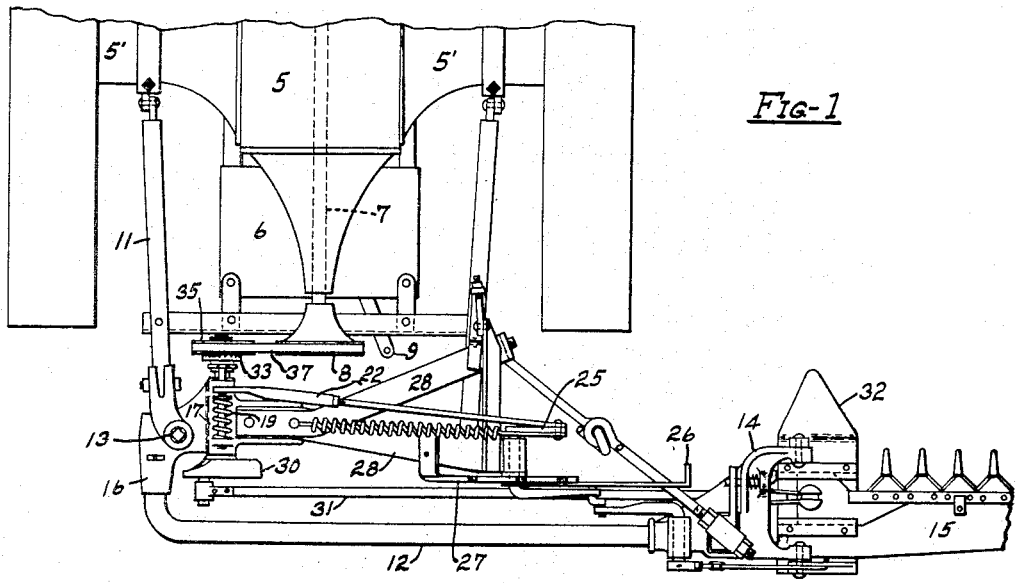
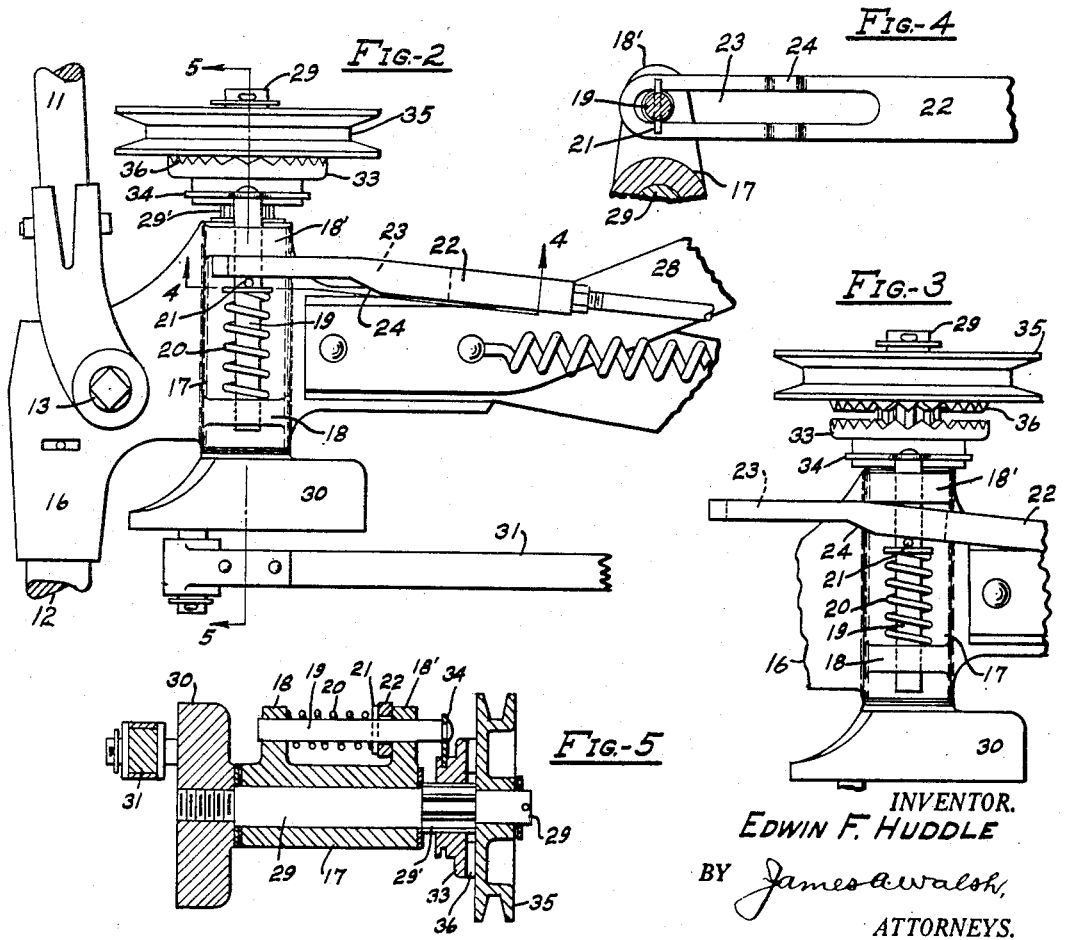
INVENTOR.
EDWIN F. HUDDLE
BY James A. Walsh,
ATTORNEYS.

Patented Apr. 17, 1934

1,955,544

UNITED STATES PATENT OFFICE 1,955,544

MOWER

Edwin F. Huddle, Rockford, Ill., assignor to J. I. Case Company, Racine, Wis., a corporation Application November 17, 1933, Serial No. 698,394

7 Claims. (Cl. 56—25)

My present invention relates to tractor operated mowers of the character disclosed in my copending application Serial No. 675,355, filed June 12, 1933, and consists in certain improvements in construction and operation whereby when the cutting mechanism is being vertically adjusted the actuating mechanism thereof will be rendered inoperative until such cutting mechanism has been returned to normal position.

In the accompanying drawing, forming part hereof, Figure 1 is a fragmentary plan view of a tractor mower embodying my invention; Figs. 2 and 3, detail views of clutch mechanism employed and showing the same in engaged and disengaged relation to the tractor power transmission; Fig. 4, a detail of the clutch adjusting cam-bar taken on the dotted line 4—4 in Fig. 2; and Fig. 5 is a detail section taken on the dotted line 5—5 in Fig. 2.

In said drawing the numeral 5 indicates the tractor, embodying axle housings 5', platform 6, power take-off shaft 7, a pulley 8 on the latter, and a drawbar 9. As said parts, and the general construction of the mower frame, cutting mechanism, and the pivotal connection of said frame with the tractor, as well as other detail features, are similar to those shown and described in said application it is deemed unnecessary to specifically describe the same herein, my present improvement relating particularly to means for rendering the cutting mechanism inoperative while being adjusted in vertical directions, as will now be described.

Upon the end of the arm 11 a push-rod 12 is pivotally mounted, at 13, independently of the draw-bar, and its opposite end is connected to a yoke 14 hingedly secured, as is common, to the cutter-bar 15. A bracket 16 is secured to the pivotal connection 13, and includes a bearing 17 having arms 18, 18', in which a clutch-pin 19 is slidably mounted and yieldingly controlled by a spring 20 held between arm 18 and a stop 21, and between which latter and the arm 18' a cam-bar 22 is slidably mounted, said bar being slotted, at 23, and having a cam 24 on its face, the opposite or outer end of the bar being connected to a crank 25 on a hand-lever 26 engageable with a quadrant 27 supported on a brace member 28 for a purpose to appear. In the bearing 17 is a shaft 29 on the rear end of which is a crank-head 30 connecting a pitman 31 with a shoe 32 and which pitman is secured to the cutter-bar 15, in a well known manner. The forward end of shaft 29 is preferably splined, at 29', and upon which is a clutch 33 slidably adjustable thereon by a fork 34 secured to the clutch-pin 19, and at the extreme end of said shaft 29 is a loosely mounted pulley 35 having a clutch member 36 adapted to be engaged by the sliding clutch 33, said pulley 35 being connected by a belt 37 to pulley 8 on the power shaft 7, or other equivalent means may be employed for drivingly engaging the power shaft and shaft 29.

During mowing operations, it will be understood that slight vertical adjustment of the cutter-bar is permitted by its usual assemblage with the shoe and associated parts, but my improvement consists in means whereby the hinged cutter-bar can be readily swung from its usual limited vertical adjustment in relation to the stubble to a wide range between horizontal and vertical positions without permitting actuation of the cutting mechanism. This is accomplished by simply pulling hand-lever 26 inwardly in the direction of the pivotal connection 13, which action through crank 25 urges cam-bar 22 in the same direction until its cam 24 engages stop 21, which adjustment forces clutch-pin 19, fork 34 and clutch 33 away from the clutch 36 on pulley 35 so that the latter will run idly on shaft 29, which shaft, the crank-head 30 and pitman 31 also become idle, and, therefore, during the continued raising of the cutting mechanism, the driven connection between pulley 35 and shaft 29 having been disengaged, said mechanism will be inoperative and accident thus avoided. Upon reversing the throw of lever 26 the cutter-bar, of course, will become lowered, and at the same time the cam-bar 22 returned to normal position, the disengagement of its cam 24 with stop 21 causing spring 20 to urge pin 19 in reverse direction and consequently engaging clutch 33 with pulley clutch 36 so that the pulley 35 will again be in driving condition. When striking obstructions it will be understood that by its pivotal connection at 13 the mower will be swung rearwardly and free from the tractor, and the belt connecting pulleys 8 and 35 displaced, in the manner fully set forth in my aforesaid application, to prevent actuation of the cutting mechanisms.

I claim as my invention:

1. The combination, with a tractor, of a main mower frame pivotally connected thereto independently of its drawbar to swing horizontally in relation to the tractor, a pitman on the frame and connected to cutting mechanism, a crank-head connected to the pitman for actuating the latter, a shaft upon which the crank-head is mounted, a bearing for the shaft through which the latter extends, driving means on the shaft, clutch mechanism engageable with the driving means, a pin engageable with the clutch for adjusting the latter on said shaft, cutting mechanism hingedly connected to the main frame, a lever on the frame, and means connected to the lever and to the pin for engaging and disengaging the clutch and driving means when the lever is adjusted.

2. The combination, with a tractor, of a main frame pivotally connected thereto to swing horizontally, a bearing supported on the frame, a crank-head at one end of the bearing and having a shaft extending through the latter, a clutch-pulley on the shaft, means on the tractor connected to the pulley for driving the latter, a clutch on the shaft, adjustable means associated with the bearing for engaging and disengaging the clutch and pulley, means connected to the adjustable means for actuating the latter, and means for operating the actuating means.

3. In a mower comprising a frame adapted to be connected to a tractor to swing horizontally in relation thereto, a bearing on the frame, a shaft in the bearing, driven means on the shaft connected with a source of power on a tractor for actuating said driven means, a pitman on said shaft and connected to cutting mechanism, means on the bearing for adjusting the driven means to drive the shaft and also to rotate said means idly on the shaft, a cam-bar associated with said adjusting means for actuating the same, and means supported by the frame and connected to the cam-bar for actuating the latter.

4. In a mower comprising a frame, means for pivotally connecting the frame to a tractor to swing horizontally, a bearing on the frame, a yieldingly mounted pin supported by the bearing, a shaft supported in the bearing, a clutch on the shaft, means for engaging the pin with the clutch, a pulley on the shaft having a clutch member engageable with said clutch, means on the tractor connected with the pulley for rotating the latter, a stop on said pin, a slotted bar slidably mounted on the pin and having means for engaging the stop to actuate the pin for declutching the pulley, and means supported by the frame for reciprocating the bar to actuate said pin.

5. In a mower comprising a frame, means for pivotally connecting the frame to a tractor, a bearing on the frame, a shaft in the bearing having a pulley at its forward end and a crank-head at its rear end, a slidable pin in the bearing, a spring encircling the pin, a clutch on the shaft engageable with the pulley, a fork on the pin engaging the clutch, means mounted on the pin for adjusting the latter to engage the clutch and pulley, and means supported on the frame and connected to said adjusting means for actuating the latter to adjust the pin.

6. In a mower comprising a frame, means for pivotally connecting the frame to a tractor, a bearing on the frame, a shaft in the bearing having driven means at its end connected to and driven by a source of power on a tractor, means on the shaft for clutching and declutching the driven means, means on the bearing for adjusting the declutching means, means associated with the adjusting means for actuating the latter, and a lever connected to the actuating means for operating the latter.

7. In a mower comprising a frame, means for pivotally connecting the frame to a tractor having a power shaft, a shaft supported on the frame, means engaging said shafts whereby the shaft on the frame will be driven by the power shaft, and means associated with said shaft for adjusting the engaging means whereby it will be non-rotatable while the power shaft rotates.

EDWIN F. HUDDLE.